United States Patent
Zhao et al.

(10) Patent No.: US 10,594,152 B1
(45) Date of Patent: Mar. 17, 2020

(54) METHOD AND SYSTEM FOR A BATTERY CHARGER

(71) Applicant: Intersil Americas LLC, Milpitas, CA (US)

(72) Inventors: Lei Zhao, Cary, NC (US); Jia Wei, Cary, NC (US)

(73) Assignee: Intersil Americas LLC, Milpitas, CA (US)

( * ) Notice: Subject to any disclaimer, the term of this patent is extended or adjusted under 35 U.S.C. 154(b) by 421 days.

(21) Appl. No.: 15/462,613

(22) Filed: Mar. 17, 2017

Related U.S. Application Data (60) Provisional application No. 62/313,190, filed on Mar. 25, 2016.

(51) Int. Cl.
   *H02J 7/00* (2006.01)

(52) U.S. Cl.
   CPC ............ *H02J 7/007* (2013.01); *H02J 7/0068* (2013.01)

(58) Field of Classification Search
   CPC ....................................... H02J 7/007
   USPC ....................................... 320/107
   See application file for complete search history.

(56) References Cited

U.S. PATENT DOCUMENTS

| | | | |
|---|---|---|---|
| 6,184,660 B1 * | 2/2001 | Hatular | H02J 7/022 320/139 |
| 7,777,455 B1 | 8/2010 | Martin et al. | |
| 8,018,212 B1 | 9/2011 | Petricek | |
| 8,102,162 B2 | 1/2012 | Moussaoui et al. | |
| 8,698,351 B2 | 4/2014 | Castelaz et al. | |
| 8,860,396 B2 | 10/2014 | Giuliano | |
| 9,218,043 B2 | 12/2015 | Wei et al. | |
| 9,246,348 B2 | 1/2016 | Solie | |
| 9,821,668 B2 | 11/2017 | Kusch et al. | |
| 9,969,290 B2 | 5/2018 | Tang et al. | |
| 2005/0242772 A1 | 11/2005 | Cha | |
| 2005/0280392 A1 | 12/2005 | Nguyen | |
| 2006/0103344 A1 | 5/2006 | Hassan et al. | |
| 2006/0181244 A1 | 8/2006 | Luo et al. | |
| 2007/0188134 A1 * | 8/2007 | Hussain | H01M 10/44 320/114 |
| 2008/0013351 A1 | 1/2008 | Alexander | |
| 2008/0055940 A1 | 3/2008 | Lawson et al. | |
| 2008/0116854 A1 | 5/2008 | Park | |
| 2008/0191555 A1 | 8/2008 | Cha | |
| 2008/0238205 A1 | 10/2008 | Lee | |
| 2009/0027013 A1 | 1/2009 | Odaohhara | |
| 2009/0033293 A1 | 2/2009 | Xing et al. | |
| 2009/0140698 A1 | 6/2009 | Eberhard et al. | |
| 2010/0194344 A1 | 8/2010 | Greyling | |

(Continued)

OTHER PUBLICATIONS

"A New Method to Parallel Two Supplies", "www.torex.co.jp", Apr. 26, 2012, pp. 1-4.

(Continued)

*Primary Examiner* — David V Henze-Gongola
(74) *Attorney, Agent, or Firm* — Foley & Lardner LLP (57) ABSTRACT

One embodiment pertains to a method including determining if external power is supplied to a power system which includes a DC-DC voltage converter; if external power is not supplied to the power system, then turn on a switching transistor in the DC-DC voltage converter and provide battery power to the load through the switching transistor; if external power is supplied to the power system, then charge a battery.

18 Claims, 9 Drawing Sheets

(56) References Cited

U.S. PATENT DOCUMENTS

| | | |
|---|---|---|
| 2010/0289457 A1 | 11/2010 | Onnerud et al. |
| 2011/0140649 A1 | 6/2011 | Choi |
| 2011/0148360 A1 | 6/2011 | Lee |
| 2011/0156655 A1 | 6/2011 | Kim |
| 2011/0227531 A1 | 9/2011 | Rajakaruna |
| 2012/0112693 A1 | 5/2012 | Kusch et al. |
| 2012/0151240 A1 | 6/2012 | Robinson et al. |
| 2013/0082643 A1 | 4/2013 | Cha |
| 2013/0086409 A1 | 4/2013 | Lu et al. |
| 2013/0106195 A1 | 5/2013 | Kusch et al. |
| 2013/0154550 A1 | 6/2013 | Balmefrezol et al. |
| 2014/0032953 A1* | 1/2014 | Wei .................. G06F 1/3234 713/323 |
| 2014/0035530 A1 | 2/2014 | Shao |
| 2014/0084862 A1 | 3/2014 | Kawaguchi et al. |
| 2014/0111139 A1 | 4/2014 | Chen et al. |
| 2014/0167694 A1 | 6/2014 | Gjinali et al. |
| 2014/0210400 A1 | 7/2014 | Goncalves et al. |
| 2014/0222271 A1 | 8/2014 | Merten et al. |
| 2014/0266011 A1 | 9/2014 | Mehta et al. |
| 2014/0327306 A1 | 11/2014 | Inoue |
| 2014/0347003 A1 | 11/2014 | Sporck et al. |
| 2015/0069956 A1 | 3/2015 | Hu et al. |
| 2015/0069970 A1 | 3/2015 | Sarkar et al. |
| 2015/0134980 A1 | 5/2015 | Chen et al. |
| 2015/0137754 A1 | 5/2015 | Yang et al. |
| 2016/0087472 A1 | 3/2016 | Sattinger et al. |
| 2016/0202743 A1 | 7/2016 | Li et al. |
| 2016/0352101 A1 | 12/2016 | Koo |

OTHER PUBLICATIONS

"AN2450 Using Multiple Chargers in Parallel", "retrieved Mar. 28, 2016 from http://www.orionbms.com/charger-integration/multiple-chargers-parallel/", 2015, pp. 1-4.

"Best Solutions for Series and Parallel Charger Installations. Utilizing multiple chargers for increasing voltage or amperage", "from the IOTA Power Products Technical Library", Sep. 19, 2013, pp. 1-4.

"Diagram: Paralleling. Parallel Charging with 2 or more Controllers v01", 2013, pp. 1-2.

"LT3790 60V Synchronous 4-Switch Buck-Boost Controller", 2014, pp. 1-28, Publisher: Linear Technology Corporation.

"Parallel Charging Using Multiple Controllers With Separate PV Arrays", "retrieved Mar. 18, 2016 from http://www.morningstarcorp.com/parallel-charging-using-multiple-controllers-separate-pv-arrays/", , pp. 1-7.

Szolusha, "Parallel Operation Minimizes Temperature Rise in Synchronous 4-Switch Buck-Boost Converters", May 18, 2015, pp. 1-6, Publisher: EDN Network.

"Battery Chargers TRUECharge2 (20A, 40A, & 60A) New Generation", "retrieved Mar. 28, 2016 from http://www.xantrex.com/power-products/battery-chargers/truecharge-2-2.aspx", , pp. 1-3.

"1-4 Cell Li Battery SMBus Change Controller for Supporting Turbo Boost Mode with N-Channel Power MOSFET Selector", Texas Instruments, Sep. 2011, Revised Jan. 2013, 42 pages.

"2-4 Cell Li Battery SMBus Charge Controller with N-Channel Power MOSFET Selector and Advanced Circuit Protection", Texas Instruments, Jul. 2010, Revised Nov. 2010, 40 pages.

"Narrow VDC Regulator/Charger with SMBus Interface", Intersil, FN6773.3, Mar. 1, 2012, 32 pages.

\* cited by examiner

METHOD AND SYSTEM FOR A BATTERY CHARGER

CROSS-REFERENCE TO RELATED APPLICATIONS

The present application claims priority to U.S. Provisional Patent Application Ser. No. 62/313,190 filed Mar. 25, 2016, the contents of which are incorporated herein by reference in their entirety.

TECHNICAL FIELD

The present embodiments relate generally to battery chargers, and more particularly to methods and systems for battery charging using a DC-DC voltage converter and a switching transistor.

BACKGROUND

The teachings of U.S. Pat. No. 9,218,043, the contents of which are incorporated by reference herein in their entirety, dramatically advanced the state of the art of battery charging systems and methods. However, opportunities for improvement remain.

SUMMARY

The present embodiments relate generally to battery charging systems and methods. One embodiment pertains to a method including determining if external power is supplied to a power system which includes a DC-DC voltage converter; if external power is not supplied to the power system, then turn on a switching transistor in the DC-DC voltage converter and provide battery power to the load through the switching transistor; if external power is supplied to the power system, then charge a battery.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Embodiments relate generally to a battery charger having fewer components and hence diminished cost.

Figure 1:
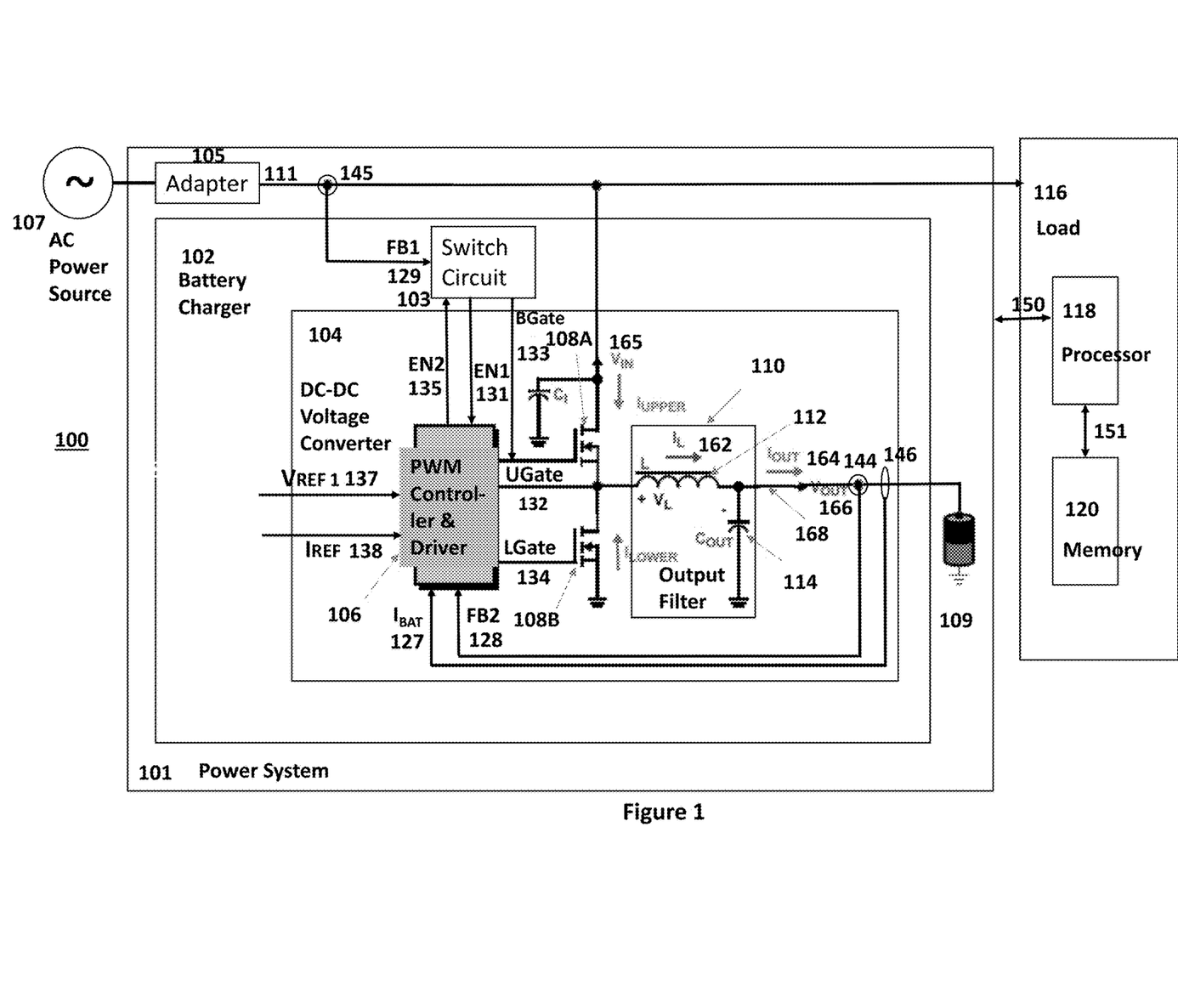
FIG. 1 illustrates an embodiment of an electrical system incorporating a battery charger.

FIG. 1 illustrates an exemplary electrical system 100 comprising a load 116, an external alternating current ('AC') power source 107, and a power system 101. In one embodiment, a communications bus 150 may be coupled between the load 116 and the power system 101 to permit communications between the load 116 and the power system 101. The AC power source 107 may be AC power provided by a utility company, a local generator, or provided from a DC to AC inverter.

The power system 101 facilitates the provision of direct current ('DC') power to the load 116 from either an adapter 105 or a battery 109. The voltage levels of the DC power supplied by the adapter 105 and battery 109 may differ. However, some loads 116 can tolerate such varying DC power voltage level and the associated voltage transient that occurs during the transition between the adapter 105 and battery 109.

In one embodiment, the power system 101 includes a battery charger 102, an adapter 105, a first voltage sensor 145, and a battery 109. The adapter 105 converts the AC power from the AC power source 107 to direct current ('DC') power. The adapter 105 provides DC power to the load 116, and to the battery charger 102 which includes a DC-DC voltage converter 104 in the battery charger 102.

The first voltage sensor 145 is coupled between the adapter 105 and load 116, and measures the adapter output voltage 111. The first voltage sensor 145 generates a first output voltage sense signal 129, FB1, representative of the adapter output voltage 111. The first voltage sensor 145 is coupled to a switch circuit 103. The switch circuit 103 is configured to receive the first output voltage sense signal 129.

The battery charger 102 includes the switch circuit 103 and the DC-DC voltage converter 104. In one embodiment, the switch circuit 103 controls when the battery 109 is charged, and alternatively when power from the battery 109 is supplied to the load 116. In a further embodiment, this operation is facilitated by configuring the switch circuit 103 to generate a first enable signal 131, EN1, and a BGate signal 133, BGate. In another embodiment, the switch circuit 103 is configured to receive a second enable signal 135, EN2.

In one embodiment, the load 116 includes a processor 118 and a memory 120; the processor 118 and memory 120 may be electrically coupled by a data bus 151 to facilitate communications between one another. The load 116, e.g. processor 118, can be electrically coupled to, communicate with, and/or control the battery charger 102, e.g. through the communications bus 150. Such communications can permit the load, e.g. to determine battery charge.

In another embodiment, the processor 118 may be one or more microprocessors, microcontrollers, embedded processors, digital signal processors, or a combination of two or more of the foregoing. The memory 120 may be one or more volatile memories and/or non-volatile memories such as static random access memory, dynamic random access memory, read only memory, flash memory, or a combination of two or more of the foregoing. This electrical system 100 may be a device related to telecommunications, automobiles, semiconductor test and manufacturing equipment, consumer electronics, or any type of equipment.

In one embodiment, the DC-DC voltage converter 104 provides power to the battery 109 with a voltage which may be more precise and efficient than a voltage provided by other voltage sources such as low drop out converters. In another embodiment, the DC-DC voltage converter 104 can be disabled and serve as a path to provide power from the battery 109 to the load 116.

The DC-DC voltage converter 104 illustrated in FIG. 1 is one embodiment of a voltage mode DC-DC voltage converter. Alternatively, the DC-DC voltage converter 104 can be implemented as a current mode DC-DC voltage converter. In one embodiment, the DC-DC voltage converter 104 can operate in buck mode, e.g. when charging the battery 109.

One embodiment of the DC-DC voltage converter 104, including its operation, will now be described. The DC-DC voltage converter 104 includes a pulse width modulation ('PWM') controller and driver 106, power and/or switching transistors, e.g. upper metal oxide semiconductor field effect transistor ('MOSFET') 108A and a lower MOSFET 108B, and an output filter 110. The PWM controller and driver 106 generates UGate control signal 132 and an LGate control signal 134 that are respectively coupled to input terminals (e.g. gates) of the upper MOSFET 108A and the lower MOSFET 108B. In one embodiment, the UGate control signal 132 and the LGate control signal 134 are generated from a PWM signal. The PWM signal, and thus the UGate control signal 132 and an LGate control signal 134 respectively, cause the upper MOSFET 108A and the lower MOSFET 108B to alternatively switch on and off. In one embodiment, the PWM controller and driver 106 may include dead time control. The output filter 110 may include a series inductor 112 and shunt capacitor 114. The output filter 110 has an input terminal coupled to an output terminal of each of the upper MOSFET 108A and a lower MOSFET 108B (e.g. source and drain, respectively); the output filter has an output terminal that is coupled to the converter output 168 of the DC-DC voltage converter 104. It should be noted that the terms "input terminal" and "output terminal" as used herein are for differentiation purposes only and do not necessarily represent any direction of current flow during any given operation condition, as will be apparent to those skilled in the art.

The DC-DC voltage converter 104 has a converter output 168 with a corresponding output voltage 166, $V_{OUT}$, and output current, $I_{OUT}$, 164. The converter output 168 is coupled to the battery 109, e.g. to facilitate charging of the battery 109 by the DC-DC voltage converter 104. Thus, the output terminal of the output filter 110 is coupled to the battery 109.

In one embodiment, a current sensor 146 is coupled to the converter output 168. The current sensor 146 generates an output current sense signal 127, $I_{BAT}$, representative of the output current 164 of the DC-DC voltage converter 104. When the battery 109 is being charged by the DC-DC voltage converter 104, the output current 164 is also the current being drawn by the battery 109. The output current sense signal 127 may communicate information about the output voltage 166 by varying its voltage or current level. In another embodiment, the PWM controller and driver 106 is configured to receive both the output current sense signal 127, and a reference current signal 138 which establishes a battery charging threshold current. In yet another embodiment, the reference current signal 138 may be programmed upon the manufacture of the battery charger 102 or power system 101, or may be externally programmed by a system designer or manufacturer.

In another embodiment, a second voltage sensor 144 is coupled to the converter output 168. The second voltage sensor 144 generates a second output voltage sense signal 128, FB2, representative of the output voltage 166. The second output voltage sense signal 128 may communicate information about the output voltage 166 by varying its voltage or current level. The PWM controller and driver 106 is coupled to the second voltage sensor 144, and thus is configured to receive the second output voltage sense signal 128. In another embodiment, the PWM controller and driver 106 is configured to receive a first reference voltage 137, $V_{REF\ 1}$, which is indicative of a desired output voltage of the DC-DC voltage converter 104. In one embodiment, the first reference voltage 137 may be programmed upon the manufacture of the battery charger 102 or power system 101, or may be externally programmed by a system designer or manufacturer.

One embodiment, as will subsequently be described in more detail, of the operation of the DC-DC voltage converter 104 to charge the battery 109 shall now be described. First, the PWM controller and driver 106 evaluates whether the difference between the output current sense signal 127 and the reference current signal 138 is greater than the difference between the second output voltage sense signal 128 and the first reference voltage 137. If it is, the PWM controller and driver 106 will operate using the output current sense signal 127 and the reference current signal 138 respectively as feedback and reference signals. If not, or when it later becomes not, the PWM controller and driver 106 will then operate using the second output voltage sense signal 128 and the first reference voltage 137 respectively as the feedback and reference signals.

In another embodiment, the PWM controller and driver 106 is coupled to the switch circuit 103. In a further embodiment, the switch circuit 103 generates, and the PWM controller and driver 106 is configured to receive, a first enable signal 131, EN1. The first enable signal 131 activates and deactivates the DC-DC voltage converter 104. In another embodiment, the PWM controller and driver 106 generates, and the switch circuit 103 is configured to receive the second enable signal 135, EN2. The second enable signal 135 communicates whether the battery 109 is sufficiently charged, e.g. has a voltage of at least the first reference voltage 137. If the second enable signal 135 indicates that the battery 109 is sufficiently charged then the switch circuit 103, through first enable signal 131, will deactivate the DC-DC voltage converter 104 so that it does not attempt to charge the battery 109. In another embodiment, the determination of whether the battery 109 is sufficiently charged may be performed elsewhere in the battery charger 102.

In one embodiment, the upper MOSFET 108A and the lower MOSFET 108B are powered by the adapter 105. In another embodiment, the adapter 105 provides a direct current ('DC') input voltage 165, $V_{IN}$, which is coupled to the drain of the upper MOSFET 108A.

One embodiment of the operation of the power system 101 will now be described. When the adapter 105 receives AC power from the AC power source 107, the first voltage sensor 145 detects that there is a non-zero adapter output voltage 111, and generates a corresponding first output voltage sense signal 129. Upon receipt of the first output voltage sense signal 129 indicative of a non-zero adapter output voltage 111, the switch circuit 103 generates a first enable signal 131 that activates the DC-DC voltage converter 104 to operate, e.g. in buck mode, to charge the battery 109. The switch circuit 103 generates no BGate signal 133 so as not to interfere with the operation of the DC-DC voltage converter. In one embodiment, when the Bgate signal 133 that turns off the upper MOSFET 108A is not applied, a high impedance is present on the signal line that provides the Bgate signal 133 so as not to affect the normal operation of the DC-DC voltage converter 104.

In another embodiment, prior to enabling the PWM controller and driver 106 when the first output voltage sense signal 129 indicates that the adapter output voltage 111 is substantially non-zero, the second voltage sensor 144 generates a second output voltage sense signal 128 indicative of the voltage level of the battery 109. The PWM controller and driver 106 determines whether the voltage of the battery 109 is equal or greater than the first reference voltage 137. If the PWM controller and driver 106 determine that the voltage of the battery 109 is equal or greater than the first reference voltage, then the PWM controller and driver 106 transmits the second enable signal 135 indicating that the battery is charged. Upon receipt of the second enable signal 135 indicating that the battery is sufficiently charged, the switch circuit 103 will disable the operation of the DC-DC voltage converter 104, e.g. will disable operation of the PWM controller and driver 106, so not to attempt to charge the battery 109. In one embodiment, the switch circuit 103 facilitate such disablement by not transmitting the first enable signal 131.

When AC power is no longer provided to the input of the adapter 105, the adapter output voltage 111 becomes substantially zero volts. As a result, the first voltage sensor 145 generates a first output voltage sense signal 129 corresponding to the substantially zero volt level. Thus, the switch circuit 103 no longer generates a first enable signal 131 so as to disable the PWM controller and driver 106, and generates a BGate signal 133 (i.e. switch control signal) that causes the upper MOSFET 108A to turn on, and provide a conductive path through the upper MOSFET 108A and the inductor 162 so that the battery 109 can power the load 116. It should be noted that one aspect of this configuration is that no additional BFET is required as in some conventional approaches.

Figure 2:
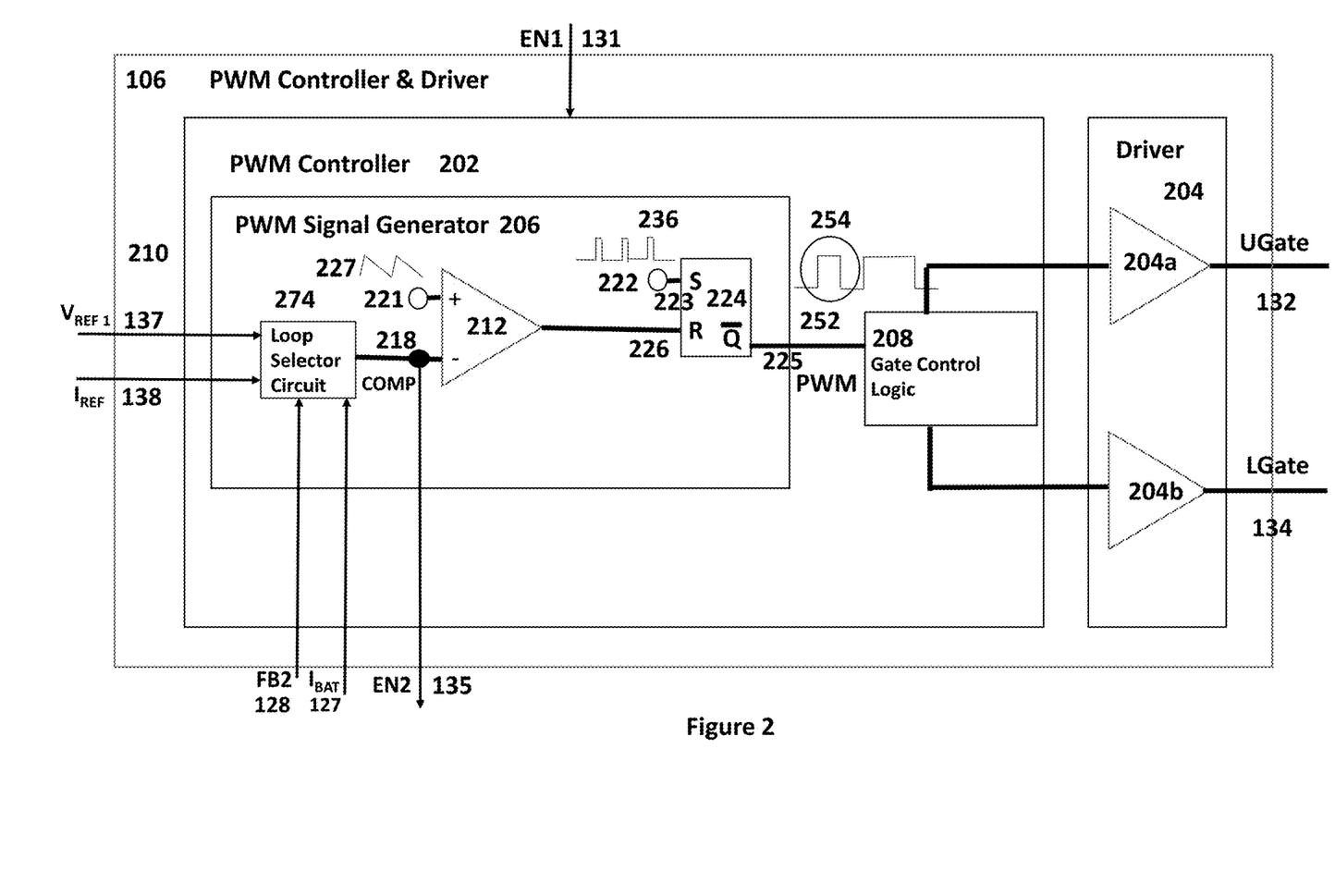
FIG. 2 illustrates an embodiment of a PWM controller and driver.

FIG. 2 illustrates an exemplary PWM controller and driver 106 which includes a PWM controller 202 and a driver 204. The PWM controller 202 generates control signals to respectively turn on and off the upper MOSFET 108A and the lower MOSFET 108B. The driver 204 increases the voltage level of the signal(s) generated from the PWM controller 202 to a higher voltage level necessary to turn on and off the upper MOSFET 108A and the lower MOSFET 108B.

In one embodiment, the PWM controller 202 includes a PWM signal generator 206 coupled to gate control logic 208. The PWM signal generator 206 generates a PWM signal 252 consisting of pulses 254. In one embodiment, the gate control logic 208 is used to convert the PWM signal 252 to signals, e.g. complementary signals, whose voltage levels are then amplified or level shifted by the driver 204 to alternatively turn on and off the upper and lower MOSFETs 108A, 108B. In a further embodiment, the gate control logic 208 can be partially in the PWM controller 202 and partially in the driver 204. In another embodiment, the gate control logic 208 is located entirely within the driver 204.

In a further embodiment, the driver 204 includes a first driver 204a, and a second driver 204b, e.g. including voltage level shifters, having inputs respectively coupled to outputs of the gate control logic 208. The first driver 204a and second driver 204b have outputs which respectively provide the UGate control signal 132 and the LGate control signal 134 to, and are coupled to, the upper MOSFET 108A and the lower MOSFET 108B.

In one embodiment, further illustrated below, the PWM controller 202, and hence the PWM signal generator 206, is implemented in at least one operating mode as a voltage mode controller. However, alternative controller techniques can be used, including without limitation synthetic ripple regulation as further described in U.S. Pat. No. 7,132,820, which is hereby incorporated by reference.

In one embodiment, the PWM signal generator 206 includes a loop selector circuit 274, a PWM comparator 212, a PWM SR flip flop 224, a saw tooth wave generator 221, and a clock signal generator 222. Initially, in another embodiment, if the battery 109 is substantially discharged, the loop selector circuit 274 will select the reference current signal 138 and the output current sense signal 127 as the reference and feedback signals for PWM signal generator 206 control loop. The loop selector circuit 274, subsequently described, monitors when the output current 164 (drawn by the battery 109) falls below the current level corresponding to the reference current signal 138 which indicates that the battery 109 is substantially charged. Thereafter, the loop selector circuit 274 selects the first reference voltage 137 and the second output voltage sense signal 128 as the reference and feedback signals. The first reference voltage 137 corresponds to a desired voltage of the battery 109. The DC-DC voltage converter 104 will continue to charge the battery 109, and drive the output voltage 166 to that desired voltage.

The output of the loop selector circuit 274 is configured to provide a COMP signal 218, COMP. In one embodiment, the COMP signal 218 can be the second enable signal 135. If only the loop selector circuit 274 is enabled while the rest of the DC-DC voltage converter 104 is disabled, the COMP signal 218 can indicate whether the battery 109 is sufficiently charged, e.g. has a sufficiently high voltage. For example, a COMP signal 218 that is substantially zero indicates that second output voltage sense signal 128 (indicative of the voltage of the battery 109) is substantially equal to the first reference voltage 137, and thus that the battery is sufficiently charged.

In one embodiment, the negative input of a PWM comparator 212 is configured to receive the COMP signal 218. The positive input of the PWM comparator 212 is configured to receive a saw tooth waveform 227 from the saw tooth wave generator 221. The reset input 226 of a PWM SR flip flop 224 is configured to receive a signal provided by the output of the PWM comparator 212. A set input 223 of the PWM SR flip flop 224 is configured to receive a clock signal 236 from a clock signal generator 222. The complementary output 225, Q bar, of the PWM SR flip flop 224 provides the PWM signal 252. In another embodiment, the PWM SR flip flop 224 may have a non-complementary output which provides a complementary PWM signal. In yet another embodiment, for current mode control, the saw tooth wave generator 221 is replaced by an inductor current sense signal representative of current flowing through the inductor.

In one embodiment, the PWM controller and driver 106 is fabricated on a single integrated circuit (IC). Alternatively, the PWM controller and driver 106 may be fabricated on separate ICs, e.g. with the PWM controller and driver fabricated on separate ICs. In a further embodiment, the upper MOSFET 108A and the lower MOSFET 108B may be fabricated on a single IC. In yet another embodiment, the upper MOSFET 108A and lower MOSFET 108B may be fabricated on the same IC as the PWM controller and driver 106. In yet a further embodiment, the gate control logic 208 can be fabricated on the same IC as the driver 204, where the remainder of the circuitry of the PWM Controller 202 are fabricated on a separate IC. In a further embodiment, at least one of the upper MOSFET 108A and the lower MOSFET 108B, and the driver 204 are fabricated on separate semiconductor substrates.

Figure 3:
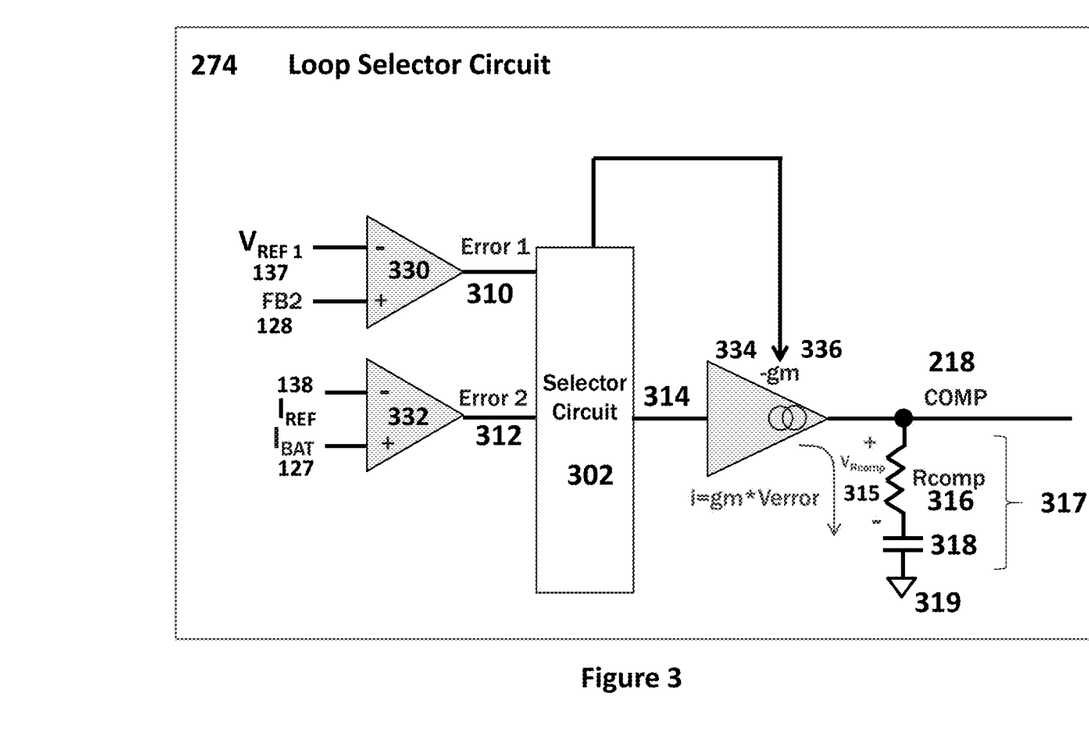
FIG. 3 illustrates one embodiment of a loop selector circuit.

FIG. 3 illustrates an exemplary loop selector circuit 274. The loop selector circuit includes a first error amplifier 330, a second error amplifier 332, a selector circuit 302, a $g_m$ error amplifier 334 and a filter 317. The filter 317 includes a resistor 316, $R_{COMP}$, in series with a capacitor 318. One node of the capacitor is coupled to a reference voltage 319, e.g. ground.

The first error amplifier 330 is configured to receive the first reference voltage 137 and the second output voltage sense signal 128 respectively at the negative and positive inputs of the first error amplifier 330. The first error amplifier 330 is configured to generate a first error voltage 310, Error 1, at the output of the first error amplifier 330. The second error amplifier 332 is configured to receive the reference current signal 138 and an output current sense signal 127 respectively at the negative and positive inputs of the second error amplifier 332. The second error amplifier 332 is configured to generate a second error voltage 312, Error 2, at the output of the second error amplifier 332.

The selector circuit 302 is configured to receive both the first error voltage 310 and the second error voltage 312. In one embodiment, the selector circuit 302 determines which of the first and second error voltages 310, 312 is larger. The output of the selector circuit 302 is configured to provide a selected error voltage 314 that is the larger error voltage. In one embodiment, the selector circuit 302 may scale the value of the selected, larger error voltage. In another embodiment, the selector circuit 302 also provides a $g_m$ selection signal 336 to set the $g_m$ level of the $g_m$ error amplifier 334 to the $g_m$ appropriate for the selected error voltage. The variable $g_m$ level of the $g_m$ error amplifier 334 permits the $g_m$ error amplifier 334 to generate a COMP signal 218 whose value is comparable regardless of the error amplifier used. In a further embodiment, the $g_m$ error amplifier 334 is configured to receive both the selected error voltage 314 and the $g_m$ selection signal 336.

The $g_m$ error amplifier 334 is a transconductance error amplifier which generates an output current proportional to the selected $g_m$ of the $g_m$ error amplifier 334 times the voltage level of the selected error voltage 314. The voltage at the output of the loop selector circuit 274, i.e. the voltage of COMP, equals such output current times the value of the resistor $R_{COMP}$ 316.

Figure 4:
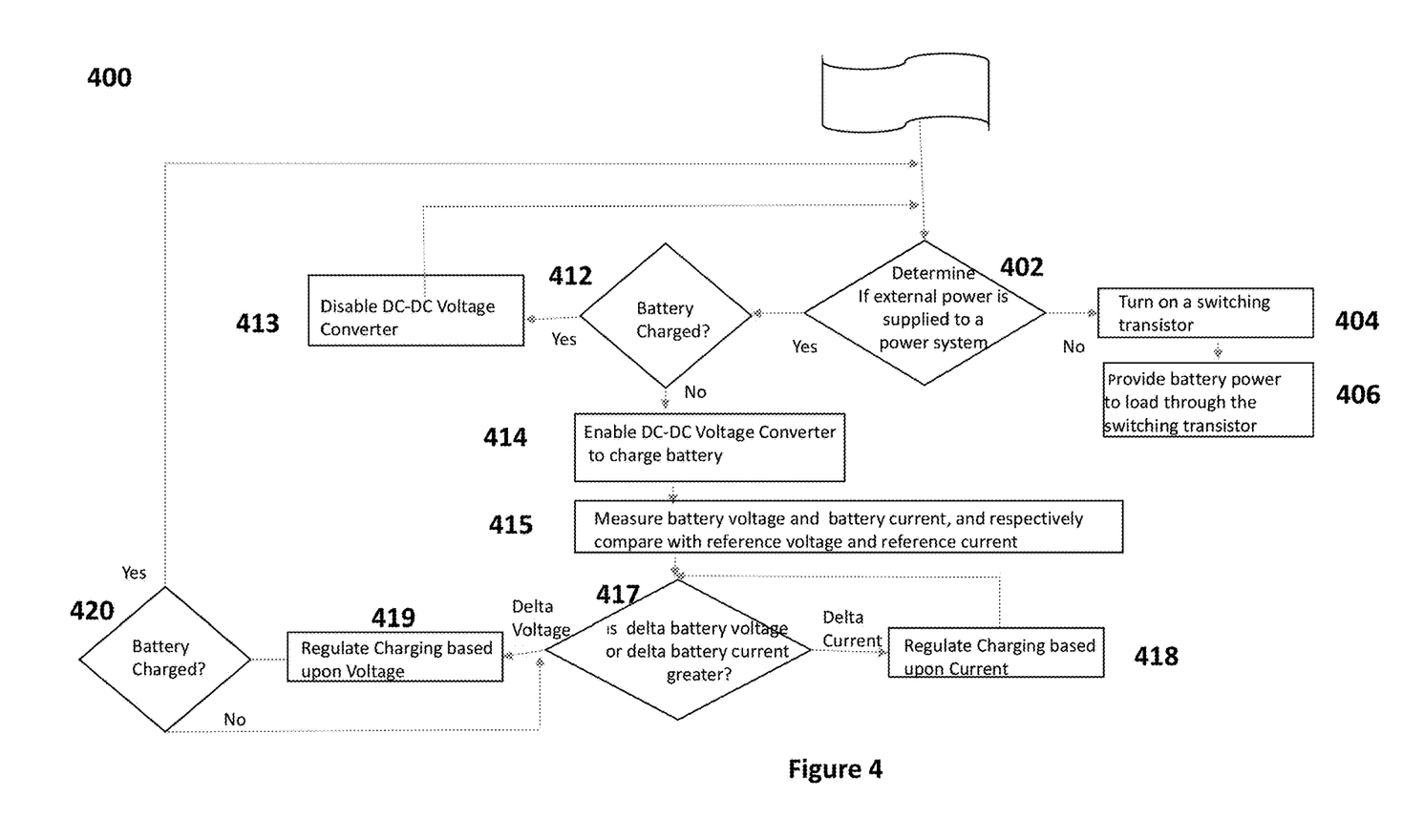
FIG. 4 illustrates one embodiment of an operation of a power system.

One embodiment of a method of operation 400 of the power system 101 incorporating a battery charger 102 will now be described, as further illustrated in FIG. 4. In block 402, determine if external power, e.g. by the AC power source 107, is supplied to the power system 101. In one embodiment, this is ascertained by measuring the adapter output voltage 111 as described herein. If external power is not being supplied to the power system 101, then in block 404 turn on a switching transistor, e.g. the upper MOSFET 108A. Then in block 406 provide power from the battery 109 to the load through the switching transistor. In one embodiment, such power is also provided through the inductor 112 which is in series with the battery 109 and the upper MOSFET 108A.

If external power is being supplied to the power system 101, then in block 412 determine if the battery 109 is charged. In one embodiment, as described herein, the voltage of the battery 109 can be measured and compared to a reference voltage, e.g. the first reference voltage 137 which is equal to the desired battery voltage, to determine if the battery 109 is charged. In a further embodiment, a second enable signal 135 which is the COMP signal 218 will signify if the battery 109 is charged, e.g. if the COMP signal 218 is substantially zero volts. If the battery is charged, then in block 413 disable the DC-DC voltage converter 104 so that it does not charge the battery 109. In one embodiment, this can be done by providing the second enable signal 135 to the switch circuit 103 so as to disable the first enable signal 131, thus disabling the PWM controller and driver 106, and therefore disabling the DC-DC voltage converter 104.

If the battery 109 is not charged, then in block 414 enable the DC-DC voltage converter 104. Then, in block 415, measure the voltage of and current drawn by the battery 109, and compare them respectively to a reference voltage and a reference current. In one embodiment, the second output voltage sense signal 128 (representative of the battery voltage) is compared against the first reference voltage 137, and the output current sense signal 127 (representative of the battery current) is compared against the reference current signal 138. Then, in block 417 determine which is greater: the difference between the battery voltage and the reference voltage (the 'delta battery voltage'), or the difference between the battery current and the reference current (the 'delta battery current'). If the delta current is larger than the delta voltage, then in block 418 regulate charging the battery 109 based upon current, e.g. utilize the reference current signal 138 and the output current sense signal 127 to regulate the DC-DC voltage converter 104. Subsequently, repeat block 417.

If the delta voltage is larger than the delta current, then in block 419 regulate charging based upon voltage, e.g. utilize the first reference voltage 137 and the second output voltage sense signal 128 to regulate the DC-DC voltage converter 104. Next, in block 420 determine if the battery is charged, e.g. if the second output sense signal equals the first reference voltage 137. If no, repeat block 419. If yes, repeat block 402.

Figure 5:
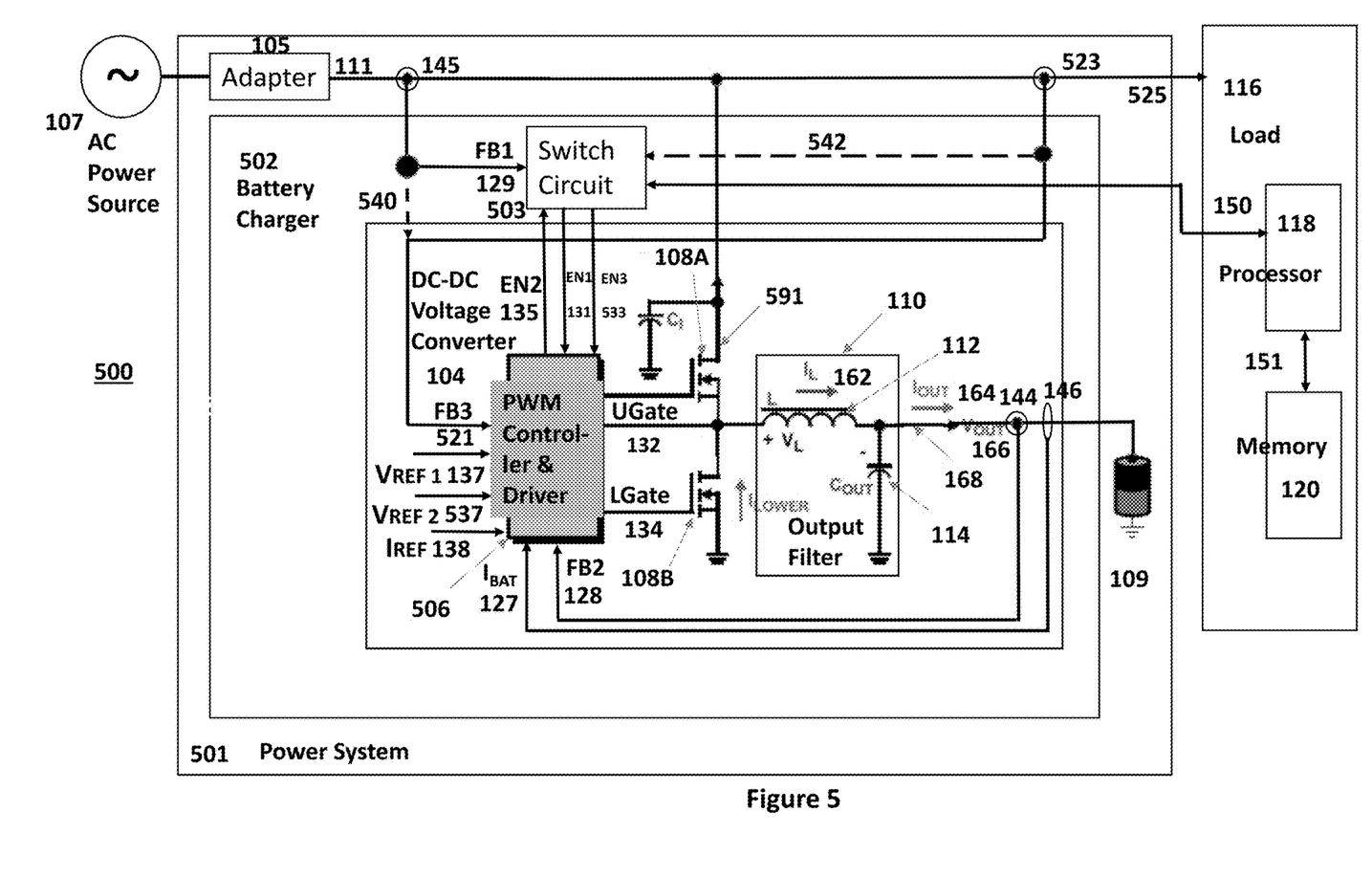
FIG. 5 illustrates another embodiment of an electrical system incorporating a battery charger.

FIG. 5 illustrates another embodiment of an electrical system 500 comprising the load 116, the AC power source 107, and a power system 501. The power system 501 provides substantially the same voltage to the load whether power is being supplied by the adapter 105 or the battery 109. To facilitate this, in one embodiment and when providing power to the load 116, the DC-DC voltage converter 104 operates as a boost converter to increase the voltage of the battery 109 to substantially the voltage level of the adapter output voltage 111. In a further embodiment, the boosted voltage is provided to the load 116 at the drain 591 of the upper MOSFET 108A.

In one embodiment, the battery charger 502 used to implement the foregoing is known as a narrow VDC charger and provides a voltage level to the load 116 that is substantially equal to the adapter output voltage 111. Narrow VDC chargers can increase battery charger 102 efficiency and the life of the battery 109, while diminishing the effects of large voltage transients at the power input to the load 116.

To facilitate the foregoing, the switch circuit 503 is configured to generate a third enable signal 533, EN3. The PWM controller and driver 506 is configured to receive the third enable signal 533. In one embodiment, the third enable signal 533 directs the DC-DC voltage converter 104 to operate in either buck or boost mode. In another embodiment, the third enable signal 533 is used to select the appropriate output voltage sense signal and reference voltage by which to regulate output voltage 166 of the DC-DC voltage converter 104. Additionally, a second reference voltage 537, $V_{REF\ 2}$, is provided to the PWM controller and driver 106. The second reference voltage 537 is representative of the desired voltage level that should be provided by the DC-DC voltage converter 104 to the load 116. The third enable signal 533 is also used to select whether the first reference voltage 137 or second reference voltage 537 is provided to the PWM controller and driver 106 respectively when DC-DC voltage converter 104 is being used to charge the battery 109, or to provide power to the load 116. In one embodiment, the first enable signal 131 and the third enable signal 533 may be combined into a single enable signal.

In one embodiment, the battery charging functionality of the battery charger 502 illustrated in FIG. 5 is the same as described above for the battery charger 102 shown in FIG. 1. In this embodiment, except for example if the battery 109 is fully charged, the DC-DC voltage converter 104 operates regardless of whether the adapter 105 or the battery 109 powers the load. When the adapter 105 solely powers the load 116, the DC-DC voltage converter 104, e.g. operating as a buck converter, can charge the battery 109.

When the battery 109 solely powers the load 116, the DC-DC voltage converter 104, e.g. operating as a boost converter, supplies power to the load 116 from the drain of the upper MOSFET 108A. In another embodiment, should the load 116 require more power than can be provided by the adapter 105, the load 116 may command the power system 101, e.g. through the communications bus 150, to have both the adapter and battery 109 supply power simultaneously to the load 116. For example, in such an event, the DC-DC voltage converter 104 may also operate as a boost converter.

To regulate the voltage level supplied to the load 116 ('load voltage' 525) by the DC-DC voltage converter 104, a third output voltage sense signal 521, FB3, representative of the load voltage is provided to the PWM controller and driver 106. In one embodiment, the third output voltage sense signal 521 is generated by a third voltage sensor 523 located proximate to the load voltage 525. In another embodiment, the first output voltage sense signal 129 may generate an output voltage sense signal that is both the first output voltage sense signal 129, and the third output voltage sense signal 521 (as illustrated by connection 540); in such case there would be no third voltage sensor 523. In yet another embodiment, the third voltage sensor 523 may generate an output voltage sense signal that is both the first output voltage sense signal 129, and the third output voltage sense signal 521 (as illustrated by connection 542); in such case there would be no first voltage sensor 145.

In one embodiment, the switch circuit 503 may be configured to receive the communications bus 150. Thus, the load 116 through the communications bus 150 can command the battery charger 502 to provide power to the load 116 at the same time the adapter 105 is powering the load 116.

Figure 6:
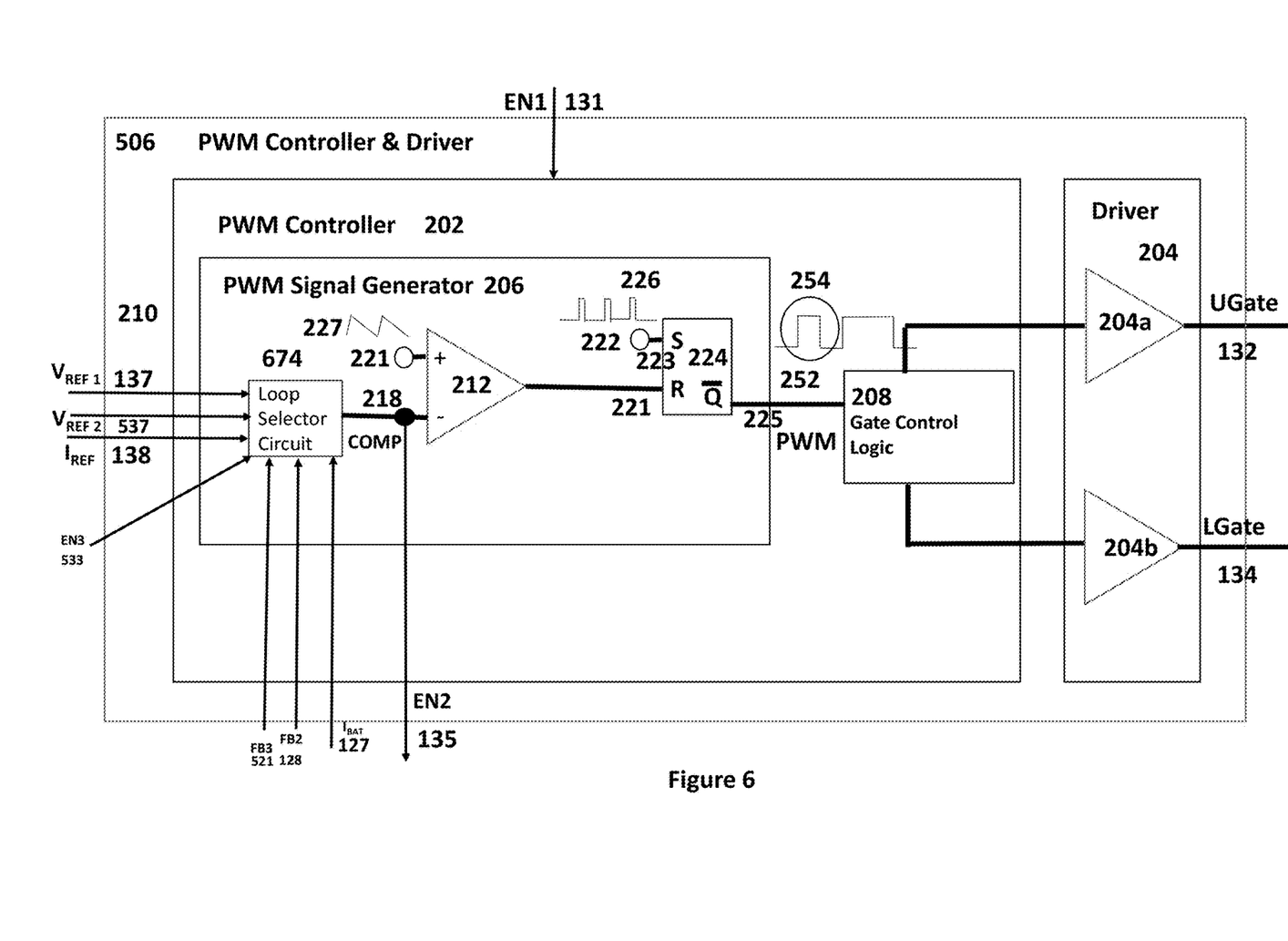
FIG. 6 illustrates another embodiment of a PWM controller and driver.

FIG. 6 illustrates another embodiment of a PWM controller and driver 506. Except as necessary to implement the functionality of the electrical system 500 illustrated in FIG. 5, in one embodiment the PWM controller and driver 506 illustrated in FIG. 5 is implemented and operates similarly as the PWM controller and driver 106 shown in FIG. 2.

In one embodiment, the PWM signal generator 206 includes a loop selector circuit 674 that is configured to receive the first reference voltage 137, the second reference voltage 537, the reference current signal 138, the second output voltage sense signal 128, the third output voltage sense signal 521, the output current sense signal 127, and the third enable signal 533. In one embodiment, the third enable signal 533 directs the loop selector circuit 674 to utilize appropriate reference signals and a feedback signals when either charging the battery 109 or providing power from the battery 109 to the load 116. When charging the battery 109, the third enable signal 533 causes the loop selector circuit 674 to select the first reference voltage 137 and the second output voltage sense signal 128 which respectively correspond to the desired battery voltage and a signal representative of the actual battery voltage. When providing power from the battery 109 to the load 116, the third enable signal 533 causes the loop selector circuit 674 to select the second reference voltage 537 and the third output voltage sense signal 521 which respectively correspond to the desired load voltage and a signal representative of the actual load voltage.

In a further embodiment, the communications bus 150 can command the switch circuit 503 to have the battery 109 provide supplemental power to the load 116 while the adapter 105 is providing power to the load 116. Thus, the switch circuit 503 would generate a third enable signal 533 which would cause the loop selector circuit 674 to select the second reference voltage 537 and the third output voltage sense signal 521.

Figure 7:
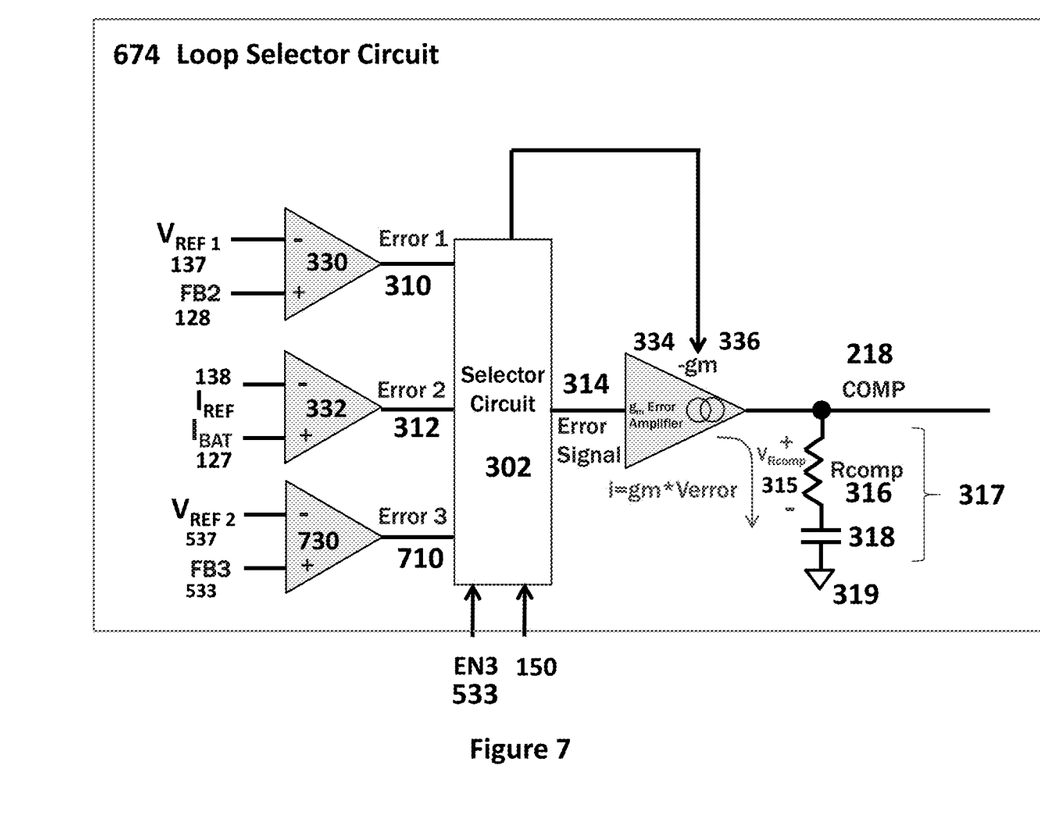
FIG. 7 illustrates another embodiment of a loop selector circuit.

FIG. 7 illustrates one embodiment of the loop selector circuit 674 which is implemented and operates similarly to the loop selector circuit 274 illustrated in FIG. 7. However, in one embodiment, the loop selector circuit 674 (a) includes an additional third error amplifier 730, (b) is configured to receive the third enable signal 533, and (c) is coupled to the communications bus 150. The third error amplifier 730 is configured to receive the second reference voltage 537 and the third output voltage sense signal 521 respectively at its negative and positive inputs. The third error amplifier 730 is configured to generate a third error voltage 710, Error 3, at the output of the third error amplifier 730. If commanded by the third enable signal 533, the selector circuit 302 will select the third error voltage 710, and the $g_m$ selection signal 336 will have the $g_m$ error amplifier 334 use a $g_m$ associated with the third error amplifier 730. As a result, the DC-DC voltage converter 104 will use a reference and sense signal corresponding to a voltage to be provided to the load 116.

Figure 8:
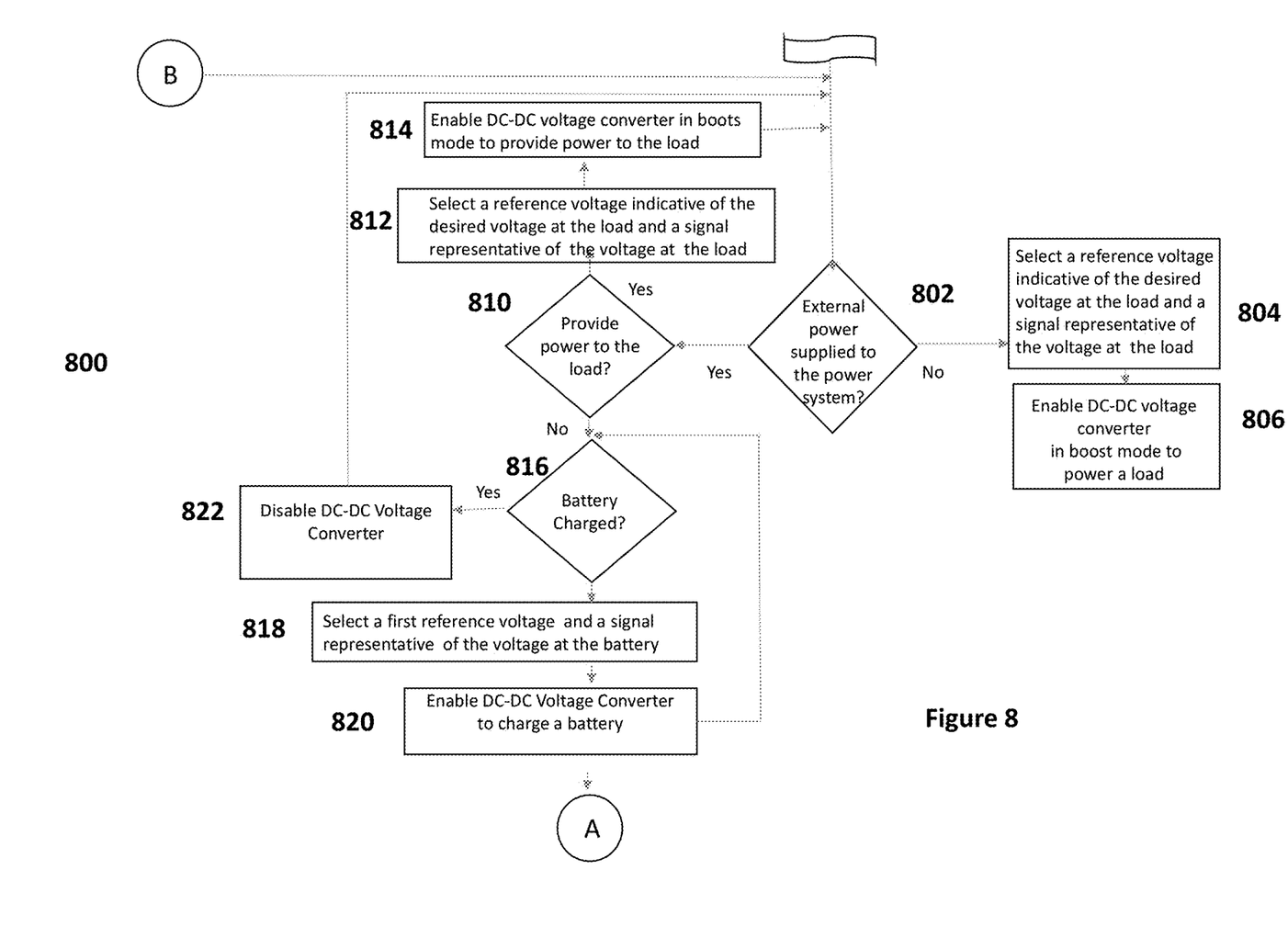
FIG. 8 illustrates another embodiment of operation of a power system.

One embodiment of a method of operation 800 of a power system 501 incorporating a battery charger 502 will now be described, as further illustrated in FIG. 8. In block 802, determine if external power, e.g. by the AC power source 107, is supplied to the power system 501. In one embodiment, this is ascertained by measuring the adapter output voltage 111 as described herein. If external power is not being supplied to the power system 101, then in block 804 select a reference voltage indicative of the desired voltage at the load, e.g. the second reference voltage 537, and a feedback signal representative of the voltage at the load 116, e.g. the third output voltage sense signal 521, for the DC-DC voltage converter 104. Then in block 406, enable the DC-DC voltage converter 104 to provide power to the load 116. In one embodiment, the DC-DC voltage converter 104 provides power, in boost mode, to the load 116 from a battery 109 by increasing the voltage of the battery 109 to a higher voltage provided to the load 116.

If external power is being supplied to the power system 101, then in block 810 determine if the battery 109 should also provide power to the load 116. In one embodiment, as further described herein, the load 116 is capable of commanding the battery charger 502, through the communications bus 150, to provide power to the load 116.

If battery is to provide power to the load 116, e.g. boost the power to the load 116, then in block 812 select a reference voltage indicative of the desired voltage at the load, e.g. the second reference voltage 537, and a feedback signal representative of the voltage at the load 116, e.g. the third output voltage sense signal 521, for the DC-DC voltage converter 104. Then in block 814, enable the DC-DC voltage converter 104 to provide power to the load 116. In one embodiment, the DC-DC voltage converter 104 provides power to the load 116 by acting as a boost converter to increase the voltage of the battery 109 to a higher voltage provided to the load 116.

If the battery is not to provide power to the load 116, then in block 816 determine if the battery is charged. In one embodiment, a second enable signal 135 which is the COMP signal 218 will signify if the battery 109 is charged, e.g. if the COMP signal 218 is substantially zero volts. If the battery is charged, then in block 822 disable the DC-DC voltage converter 104 so that it does not charge the battery 109. In one embodiment, this can be done by providing the second enable signal 135 to the switch circuit 103 so as to disable the first enable signal 131, thus disabling the PWM controller and driver 106, and therefore disabling the DC-DC voltage converter 104.

If the battery 109 is not charged, then in block 818 select a first reference voltage 137 and a signal representative of the voltage at the battery 109, e.g. the second output voltage sense signal 128. Then, in block 820, enable the DC-DC voltage converter 104 to charge the battery 109. Then, in block 824, measure the voltage of and current drawn by the battery 109, and compare them respectively to a reference voltage and a reference current. In one embodiment, the second output voltage sense signal 128 (representative of the battery voltage) is compared against the first reference voltage 137, and the output current sense signal 127 (representative of the battery current) is compared against the reference current signal 138. Then, in block 826 determine which is greater: the difference between the battery voltage and the reference voltage (the 'delta battery voltage'), or the difference between the battery current and the reference current (the 'delta battery current'). If the delta current is larger than the delta voltage, then in block 828 regulate charging the battery 109 based upon current, e.g. utilize the reference current signal 138 and the output current sense signal 127 to regulate the DC-DC voltage converter 104. Subsequently, repeat block 826.

If the delta voltage is larger than the delta current, then in block 830 regulate charging based upon voltage, e.g. utilize the first reference voltage 137 and the second output voltage sense signal 128 to regulate the DC-DC voltage converter 104. Next, in block 832 determine if the battery is charged, e.g. if the second output sense signal equals the first reference voltage 137. If no, repeat block 830. If yes, repeat block 802.

The invention may be implemented with other DC-DC converter topologies, including without limitation a buck-boost converter.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A battery charger, comprising:
    a switch circuit configured to receive a first output voltage sense signal representative of an adapter output voltage, wherein the switch circuit is configured to generate a first enable signal and a control signal at least partially dependent on the adapter output voltage represented by the received first output voltage sense signal; and
    a DC-DC voltage converter comprising an upper power transistor and a lower power transistor, wherein the upper power transistor is configured to receive the control signal;
    an output filter configured to be coupled between the upper power transistor and a battery, wherein in response to the control signal, the upper power transistor is configured to provide power from the battery to a load through the output filter;
    wherein the DC-DC voltage converter further includes a PWM controller and driver configured to receive the first enable signal, and wherein the DC-DC voltage converter is configured to, at least partially dependent on the first enable signal, charge the battery by controlling the upper power transistor and the lower power transistor;
    wherein the PWM controller and driver comprises: a loop selector circuit that has an output, and is configured to receive a second output voltage sense signal representative of an output voltage of the DC-DC voltage converter, an output current sense signal representative of an output current of the DC-DC voltage converter, a reference voltage signal, and a reference current signal; and a PWM comparator coupled to the output of the loop selector signal; and
    wherein the loop selector circuit comprises: a first error amplifier having an output, and configured to receive the reference voltage signal and the second output voltage sense signal; a second error amplifier having an output, and configured to receive the current reference signal and the output current sense signal; a selector circuit having at least one output, and coupled to the output of the first error amplifier and the output of the second error amplifier; a third error amplifier coupled to the at least one output of the selector circuit.

2. The battery charger of claim 1, further comprising: a voltage sensor coupled to the output filter, and configured to provide a second output voltage sense signal to the PWM controller and driver; and a first reference voltage signal provided to the PWM controller and driver.

3. The battery charger of claim 2, further comprising:
a current sensor coupled to an output terminal of the output filter and configured to provide an output current sense signal to the PWM controller and driver; and
a reference current signal provided to the PWM controller and driver.

4. The battery charger of claim 1, wherein the PWM controller and driver is configured to generate a second enable signal that is provided to the switch circuit.

5. The battery charger of claim 1, wherein the upper and lower power transistors are MOSFETs.

6. A method, comprising:
determining if external power is supplied to a power system which includes a DC-DC voltage converter;
if external power is not supplied to the power system, then turning on a switching transistor in the DC-DC voltage converter and providing power from a battery to a load through the switching transistor;
if external power is supplied to the power system, then charging the battery using the switching transistor in the DC-DC voltage converter;
wherein if external power is supplied to the power system, then charging the battery further comprises:
determining if the battery is charged;
if the battery is charged, then disabling the DC-DC voltage converter; and
if the battery is not charged then enabling the DC-DC voltage converter and charging the battery; and
further comprising:
measuring battery voltage and battery current;
comparing the battery voltage and battery current respectively with a reference voltage and a reference current;
if the difference between the battery current and the reference current is greater than the difference between the battery voltage and reference voltage, then regulate the DC-DC voltage regulator based upon the battery current and reference current;
if the difference between the battery current and the reference current is less than the difference between the battery voltage and reference voltage, then regulate the DC-DC voltage regulator based upon the battery voltage and reference voltage; determine if the battery is charged; and
if the battery is not charged, continue to regulate the DC-DC voltage regulator based upon the battery voltage and reference voltage.

7. The method of claim 6, wherein measuring battery voltage and battery current comprises generating an output voltage sense signal and an output current sense signal, and wherein comparing the battery voltage and battery current respectively with a reference voltage and a reference current comprises comparing the output voltage sense signal and the output current sense signal respectively with a reference voltage signal and reference current signal.

8. A battery charger, comprising:
a switch circuit configured to receive a first output voltage sense signal representative of an adapter output voltage and a second output voltage sense signal representative of a voltage of a load, wherein the switch circuit is configured to generate one or both of a first enable signal and a second enable signal at least partially dependent on at least one of the adapter output voltage and the voltage of the load as represented by the first and second output voltage sense signals, respectively;
a DC-DC voltage converter comprising an upper power transistor and a lower power transistor; and an output filter configured to be coupled between the upper power transistor and a battery, wherein in response to one or both of the first and second enable signals, the DC-DC converter is configured to boost power from the battery to the load through the output filter using the upper power transistor;
wherein the DC-DC voltage converter further includes a PWM controller and driver configured to receive the first enable signal and the second enable signal, and wherein the DC-DC voltage converter is further configured to, at least partially dependent on one or both of the first enable signal and the second enable signal, charge the battery by controlling the upper power transistor and the lower power transistor, and wherein the DC-DC voltage converter is configured to receive the second output voltage sense signal representative of the voltage of the load, and a third output voltage sense signal representative of a voltage at an output of the DC-DC voltage regulator; and
wherein the PWM controller and driver comprises: a loop selector circuit that has an output, and is configured to receive the second output voltage sense signal, the third output voltage sense signal, an output current sense signal representative of an output current of the DC-DC voltage regulator, a first reference voltage signal, a second voltage reference signal, a reference current signal, and the second enable signal; and a PWM comparator coupled to the output of the loop selector signal.

9. The battery charger of claim 8, wherein the switch circuit is coupled to a communications bus which is further coupled to the load.

10. The battery charger of claim 8, wherein the loop selector circuit is further configured to receive an output current sense signal representative of an output current of the DC-DC voltage converter, and a reference current.

11. The battery charger of claim 10, wherein the loop selector circuit comprises:
a first error amplifier having an output, and configured to receive the first reference voltage signal and the second output voltage sense signal;
a second error amplifier having an output, and configured to receive the current reference signal and the output current sense signal;
a third error amplifier having an output, and configured to receive the second reference voltage signal and the third output voltage sense signal;
a selector circuit having at least one output, and coupled to the output of the first error amplifier, the output of the second error amplifier, and the output of the third error amplifier; and
a fourth error amplifier coupled to the at least one output of the selector circuit.

12. The battery charger of claim 8, further comprising: a voltage sensor, coupled to the output filter, configured to provide the third output voltage sense signal; and a reference voltage signal provided to the PWM controller and driver.

13. The battery charger of claim 11, further comprising:
a current sensor, coupled to the output terminal of the output filter, configured to provide an output current sense signal to the PWM controller and driver; and
a reference current signal provided to the PWM controller and driver.

14. The battery charger of claim 8, wherein the PWM controller and driver is configured to generate a third enable signal indicating whether a battery is charged; and wherein the third enable signal is provided to the switch circuit.

15. The battery charger of claim 8, wherein the upper and lower power transistors are MOSFETs.

16. A method, comprising:
   determining if external power is supplied to a power system which includes a DC-DC voltage converter;
   if external power is not supplied to the power system, then selecting, for the DC-DC voltage converter, a first reference voltage indicative of a desired load voltage and a feedback signal representative of the voltage at a load;
   enabling the DC-DC voltage converter in boost mode to power the load from a battery;
   determining if the battery is charged;
   if the battery is charged, then disabling the DC-DC voltage converter; and
   if the battery is not charged then enabling the DC-DC voltage converter and charging the battery, wherein enabling the DC-DC voltage converter and charging the battery further comprises:
     measuring battery voltage and battery current;
     comparing the battery voltage and battery current respectively with a second reference voltage indicative of the desired battery voltage, and a reference current;
     if the difference between the battery current and the reference current is greater than the difference between the battery voltage and the reference voltage, then regulate the DC-DC voltage regulator based upon the battery current and reference current;
     if the difference between the battery current and the reference current is less than the difference between the battery voltage and reference voltage, then regulate the DC-DC voltage regulator based upon the battery voltage and reference voltage;
   determining if the battery is charged; and
   if the battery is not charged, continuing to regulate the DC-DC voltage regulator based upon the battery voltage and reference voltage.

17. The method of claim 16, further comprising:
   if external power is supplied to the power system, determining whether the DC-DC voltage converter should provide power to the load; and
   if the DC-DC voltage converter should provide power to the load, then selecting, for the DC-DC voltage converter, a second reference voltage indicative of the desired load voltage and the feedback signal representative of the voltage at the load.

18. The method of claim 16, wherein measuring battery voltage and battery current comprises generating an output voltage sense signal and an output current sense signal, and wherein comparing the battery voltage and battery current respectively with a reference voltage and reference current comprises comparing the output voltage sense signal and the output current sense signal respectively with a reference voltage signal and reference current signal.

\* \* \* \* \*